United States Patent
Saxena et al.

(10) Patent No.: US 12,132,644 B2
(45) Date of Patent: Oct. 29, 2024

(54) DETERMINATION OF OPERATIONAL OVERHEAD OVER A UNIDIRECTIONAL NETWORK PATHWAY

(71) Applicant: International Business Machines Corporation, Armonk, NY (US)

(72) Inventors: Rajesh Kumar Saxena, Thane East (IN); Harish Bharti, Pune (IN); Anupam Gupta, Noida (IN); Sandeep Sukhija, Rajasthan (IN)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 17/878,750

(22) Filed: Aug. 1, 2022

(65) Prior Publication Data
US 2024/0039831 A1    Feb. 1, 2024

(51) Int. Cl.
*H04L 45/00* (2022.01)
*G16Y 40/30* (2020.01)

(52) U.S. Cl.
CPC .............. *H04L 45/20* (2013.01); *G16Y 40/30* (2020.01)

(58) Field of Classification Search
CPC ................................ H04L 45/20; G16Y 40/30
See application file for complete search history.

(56) References Cited

U.S. PATENT DOCUMENTS

| | | | |
|---|---|---|---|
| 6,570,849 B1* | 5/2003 | Skemer | H04L 47/2416 370/230.1 |
| 2008/0130567 A1* | 6/2008 | Jeon | H04W 72/04 370/329 |
| 2009/0003232 A1* | 1/2009 | Vaswani | H04L 45/00 370/252 |
| 2018/0332047 A1 | 11/2018 | Shah et al. | |
| 2020/0117159 A1 | 4/2020 | Wolberg et al. | |
| 2021/0120555 A1 | 4/2021 | Badic et al. | |

OTHER PUBLICATIONS

Alves et al., "No way back? An SDN protocol for directed IoT networks," Proceedings of the 15th Annual Conference on Wireless On-demand Network Systems and Services, 2019, 9 pages.

* cited by examiner

*Primary Examiner* — Philip C Lee
(74) *Attorney, Agent, or Firm* — Zilka-Kotab, P.C.

(57) ABSTRACT

A computer-implemented method according to one embodiment includes establishing, for each hop in pathways of a network, a relation between a desired reliability and channel error. Based on the established relations, a maximum number of copies of packets to send from a source in the network to a target in the network is determined. An overhead associated with sending packets from the source to the target in the network is determined for each of the hops, and a first sum of such overheads is also determined. An overhead associated with sending an acknowledgement packet to the source is determined for each of the hops. A second sum is a sum of the overheads associated with sending the acknowledgement packet to the source. In response to a determination that a sum of the first sum and the second sum is less than a predetermined threshold value, the pathways are used.

20 Claims, 5 Drawing Sheets

DETERMINATION OF OPERATIONAL OVERHEAD OVER A UNIDIRECTIONAL NETWORK PATHWAY

BACKGROUND

The present invention relates to operative overhead in a network, and more specifically, this invention relates to using unidirectional pathways for communication operations in response to a determination that an associated operative overhead is less than a predetermined threshold value.

In the current era of the Internet of Things (IoT), an array of devices and sensors are often used to form an internet-based network, e.g., a machine to machine network, to achieve a utility. For example, a first device, such as a computer, may communicate with a second device, such as a printer, to enable data from the computer to be printed. Communication between the first device and the second device may be conducted over one or more communication paths that each have a plurality of nodes that may be hopped between to establish the connection. For example, communication may be output from the first device, transmitted along at least a first plurality of nodes, and received by the second device. An acknowledgement of receipt of the communication may be output from the second device and be received by the first device.

SUMMARY

A computer-implemented method according to one embodiment includes establishing, for each hop in pathways of a network, a relation between a desired reliability and channel error. Based on the established relations, a maximum number of copies of packets to send from a source device in the network to a target device in the network is determined to attain the desired reliabilities. An overhead associated with sending packets from the source device to the target device in the network is determined for each of the hops. A first sum of the overheads associated with sending packets from the source device to the target device is incorporated into an acknowledged pathway operative. An overhead associated with sending an acknowledgement packet to the source device is determined for each of the hops. A second sum is a sum of the overheads associated with sending the acknowledgement packet to the source device. The method furthermore includes using the pathways for communication operations in response to a determination that a sum of the first sum and the second sum is less than a predetermined threshold value.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for optimizing operative overhead through a unidirectional request flow.

In one general embodiment, a computer-implemented method includes establishing, for each hop in pathways of a network, a relation between a desired reliability and channel error. Based on the established relations, a maximum number of copies of packets to send from a source device in the network to a target device in the network is determined to attain the desired reliabilities. An overhead associated with sending packets from the source device to the target device in the network is determined for each of the hops. A first sum of the overheads associated with sending packets from the source device to the target device is incorporated into an acknowledged pathway operative. An overhead associated with sending an acknowledgement packet to the source device is determined for each of the hops. A second sum is a sum of the overheads associated with sending the acknowledgement packet to the source device. The method furthermore includes using the pathways for communication operations in response to a determination that a sum of the first sum and the second sum is less than a predetermined threshold value.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
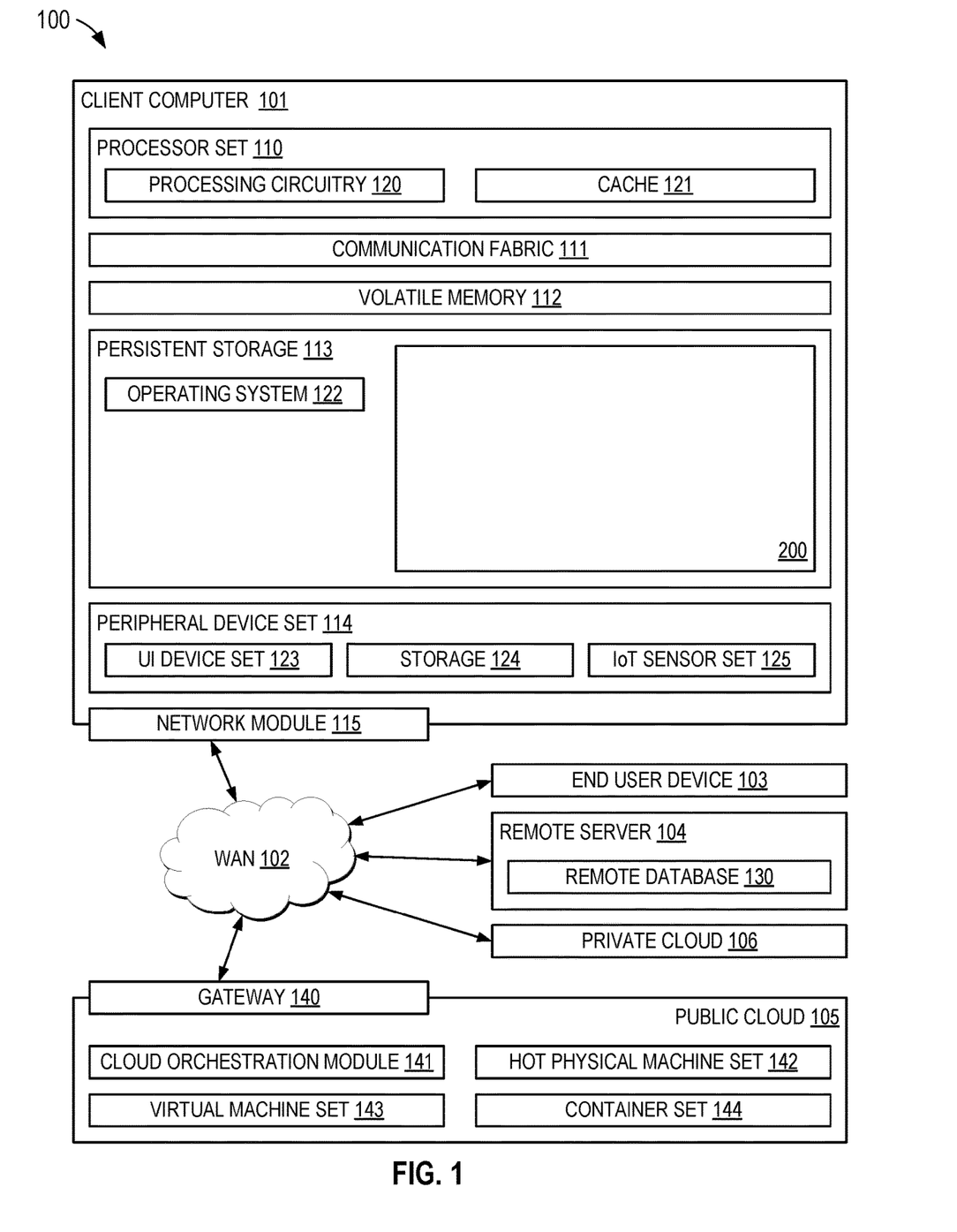
FIG. 1 is a diagram of a computing environment, in accordance with one embodiment of the present invention.

Computing environment 100 contains an example of an environment for the execution of at least some of the computer code involved in performing the inventive methods, such as block 200 that may include a module with code for determining operational overhead in a network. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As mentioned elsewhere above, in the current era of the Internet of Things (IoT), an array of devices and sensors are often used to form an internet-based network, e.g., a machine to machine network, to achieve a utility. For example, a first device, such as a computer, may communicate with a second device, such as a printer, to enable data from the computer to be printed. Communication between the first device and the second device may be conducted over one or more communication paths that each have a plurality of nodes that may be hopped between to establish the connection. For example, communication may be output from the first device, transmitted, e.g., hopped, along at least a first plurality of nodes, and received by the second device. An acknowledgement of receipt of the communication may be output from the second device and be received by the first device.

In a machine-to-machine (M2M) network formed of non-obligatory nodes, there is a minimal utility driven topology that makes the network functional, e.g., referred to hereafter as "activated core." One or more of the components of the minimal utility driven topology may at any given time lose connection with the network, as they may be non-obligatory nodes. Nodes of the network may be non-obligatory nodes, meaning that the nodes cannot be relied on to be available to use at a given time, but are available to use within the network at least some of the time. A "minimal utility driven topology" is one in which each of the nodes of the activated core are connected to at least one other node that retains connection to the network at all times. For example, a node of the activated core may be connected to a first device that loses connection with the network for two minutes each day, but also be connected with a second device that remains connected with the network during those two minutes. Because the participants of an activated core of a network are non-obligatory in nature, a relatively higher latency is acceptable, and the network drives the traffic routing specific to the transaction at hand.

When performing communication operations within some conventional M2M networks, copies of packets are typically "spammed" from a source device to a target device, e.g., such as in relatively high-overhead Transmission Control Protocol/Internet Protocols (TCPIPs) with time sensitive communication operations being performed. In other words, in order to ensure that at least one packet is successfully transmitted from the source device to a target device, more copies than is likely required to enable the transmission are sent from the source device to a target device to ensure that the transmission successfully reaches the target device. Furthermore, bi-directional pathways are typically used in conventional M2M networks. This spamming over multicast and use of bidirectional pathways contributes a substantial amount of overhead to the network operation.

Figure 2:
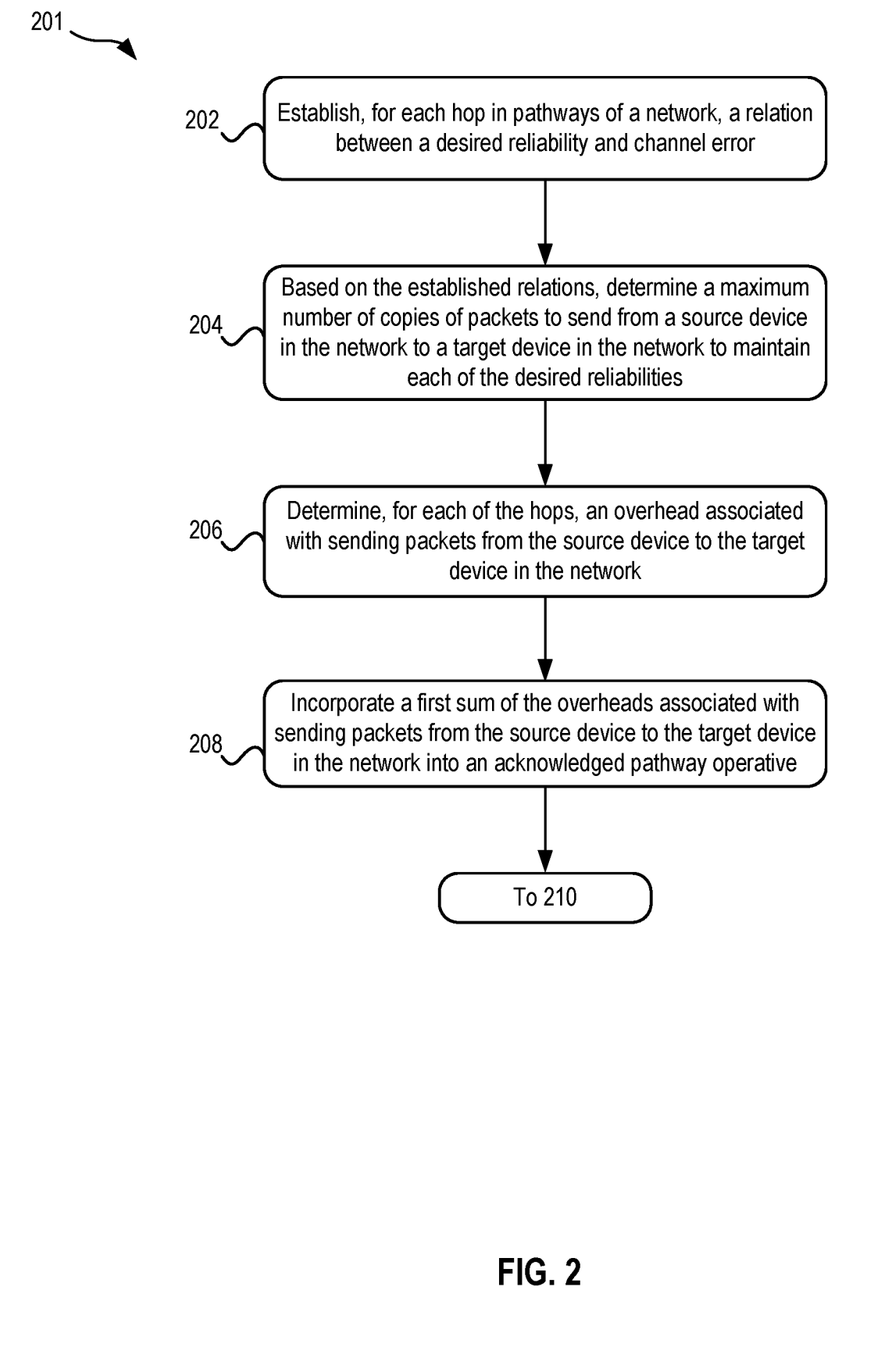
FIG. 2 is a flowchart of a method, in accordance with one embodiment of the present invention.

In extending the concept of the activated core as a nucleus of a system that would establish an operative, it becomes imperative to understand the cost associated with maintaining such an operative and then optimize such cost to enable the transactions in the established network. In sharp contrast to the deficiencies of various conventional networks and techniques described above, the techniques of various embodiments and approaches described herein consider the overhead costs associated with performing operations in a M2M network, and thereafter optionally perform such operations provided that one or more overhead thresholds are not exceeded. As will be described in greater detail elsewhere below, e.g., see method 201, once an activated core in a M2M network is established, the activated core in a way becomes a nucleus of the system that establishes an operative. This model helps to establish an understanding of the cost of this operative and thereafter enables this cost to be optimized to enable the transactions in the network. This problem may then be subsisted as that of an efficient information assurance as a key measure of a cooperative. This model may be established using the methods and framework of various embodiments and approaches described herein to optimize and/or calculate the overheads that are associated to a complete path, by employing acknowledgements across each hop in a chosen channel unicast such that the overall channel route is optimized unidirectionally. This allows the techniques to remain stateless while building a definition of reliability and packet requirements in terms of acknowledgement pathways. A framework is also enabled to reduce the number of hops which reduces overheads in a non-obligatory relatively high latency M2M network. To achieve this, a relation between a desired reliability of the network and channel error in chosen pathways is established for each hop, and the transmission is the forward process. To achieve the desired reliability, it is essential to determine and optimize a number of packet copies source that are sent as an extrapolation of single hop reliability. This may be constrained through a relative micro operative of aggregated overheads of all hops required in the channel cast. A forward cast based "acknowledged pathway operative" is also constructed, and acknowledgements are returned by each hop to harmonize the established pathways. Furthermore, a function may be established between the total overhead and reliability, that calculates a maximum number of retransmissions at the source such that the threshold reliability may be attained.

Now referring to FIG. 2, a flowchart of a method 201 is shown according to one embodiment. The method 201 may be performed in accordance with the present invention in any of the environments depicted in FIGS. 1-4, among others, in various embodiments. Of course, more or fewer operations than those specifically described in FIG. 2 may be included in method 201, as would be understood by one of skill in the art upon reading the present descriptions.

Each of the steps of the method 201 may be performed by any suitable component of the operating environment. For example, in various embodiments, the method 201 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 201. Illustrative processors include, but are not limited to, a central processing unit (CPU), an application specific integrated circuit (ASIC), a field programmable gate array (FPGA), etc., combinations thereof, or any other suitable computing device known in the art.

As briefly mentioned elsewhere above, a M2M network may include an activated core, e.g., a minimal number of nodes to achieve a utility, that is formed by one or more non-obligatory participants, e.g., non-obligatory nodes. Since the participants are non-obligatory in nature, a relatively high latency may be acceptable in some approaches.

To extend the concept of having an activated core as the nucleus of a system that would establish the operative, it is useful to understand a cost of maintaining such an operative and then optimizing it to enable the transactions in the established network.

The techniques of method 201 may be utilized to optimize and/or calculate overheads that are associated with employing acknowledgements across each hop in a chosen channel unicast, such that the overall channel route is optimized unidirectionally. This allows communications to remain stateless and builds a definition of reliability and packet requirements in terms of acknowledgement pathways.

To reduce overhead, a framework of operations is established to reduce a number of hops used to perform a communication operation. To achieve this, a relation between reliability, e.g., see ($\dot{S}$) of equations below, of a network and channel error, e.g., see ($\dot{e}$) of equations below, in the chosen pathways is established for each hop. Note that the transmission is the forward process. To achieve the desired reliability, a number of packet copies that the source sends is determined, e.g., see Equation (3) below. Based on the understanding of how many packets to send to achieve, e.g., attain, the desired reliability for one hop, a relationship may be established which enables an understanding of a total overhead, e.g., see Equation (4) below, by aggregating overheads of all the hops required for a channel cast.

By obtaining the total overhead, the overhead may be optimized by following a micro operative harmonization. For example, the calculated aggregate overhead of Equation (4), e.g., sans-acknowledgement, may be determined for each hop for forward cast. This may be handled through an acknowledged pathway operative in some approaches. In considering the acknowledgement returned by each hop, Equation (3) may be modified with this micro operative to be Equation (5). Furthermore, Equation (4) below, which establishes a relation between the total overhead and reliability may be modify to be Equation (6) with acknowledgment sent by the hops during forward cast in the chosen channel being factored in. This way an optimized operative overhead may be established.

Various illustrative approaches for determining an overhead estimate in a unidirectional flow are described below, e.g., see Equation (1)-Equation (4).

Operation 202 of method 201 includes establishing, for each hop in pathways of a network, a relation between a desired reliability, e.g., ($\dot{S}$), and channel error, e.g., ($\dot{e}$). The channel error $\dot{e}$ represents a degree of error that occurs along a pathway between a source device and a target device. Note that such a degree of error is not considered in conventional networks, which instead account for the error in using an alternative communication pathway in the event that a copy of a packet is unsuccessfully transmitted between a source device and a target device. The channel error $\dot{e}$ may be predetermined or received from a known type of error calculation engine for a given pathway in some approaches. In some other approaches, method 201 may include performing a test to determine the channel error $\dot{e}$, e.g., such as sending a predetermined number of copies of a packet along a given pathway of the channel and determining a percentage of the copies of the packets that are successfully received by a target device. In some approaches, the desired reliability ($\dot{S}$), represents an acceptable amount of reliability by which the communication operations may occur over a given pathway. The desired reliability may be predetermined upon formation of the activated core in some approaches. In some other approaches, the desired reliability may be received, e.g., from an administrator device of the network. Illustrative techniques for determining and using such variables are provided elsewhere in the equations below.

The network is in some approaches an internet-based network, e.g., an Internet of Things (IoT) network, a known type of internet-based network, etc. The network may include any number of devices, e.g., computer, processor, printer, router, signal repeater, wireless component, a fax machine, etc., that each have one or more communication paths with at least another one of the devices. Such communication paths may include one or more nodes, e.g., other devices of the internet-based network, that are hopped along by a communication transmission that is being sent from one of the devices to at least another one of the devices. Accordingly, each "hop" in pathways of the network may be a device that at least partially establishes the communication pathway between at least a first device, e.g., such as a source device, and at least a second device, e.g., such as a target device. In some approaches, the target device may be a single gravitated core node, e.g., $\dot{C}$. Moreover, in some approaches, the devices of the network are geospatially close to one another, e.g., within a predefined wireless range, within a predetermined number of hops, within a predetermined geographical distance from one another such as less than one mile, within near-band communication range, within the same building, within the same room, within the same wireless network, etc. The nodes at each of the hops of the network may in some approaches be non-obligatory participants.

In some approaches a relation between the desired reliability, e.g., ($\dot{S}$), and the channel error, e.g., ($\dot{e}$), may be established for each hop in chosen pathways of an activated core of the network, where the network is a M2M-based network. In some approaches the network may additionally and/or alternatively be an internet-based network that includes an activated core of non-obligatory nodes at the hops, where the activated core has a minimal utility driven topology that makes the network functional. The pathways may preferably be unidirectional pathways. The network may in some preferred approaches include randomly deployed sensor nodes in a given field. Links between nodes may be assumed to be symmetric. Moreover, it may be assumed that there is a single gravitated core node, e.g., $\acute{C}$, to which all data is hopped. Furthermore, a desired reliability, e.g., $\dot{S}$, is the probability with which the source device calls for the packet to be delivered to the single gravitated core node, e.g., $\acute{C}$. In some approaches, by attaining the desired reliability when transmitting copies of the packets from the source deice to a destination such as the single gravitated core node and/or a target device thereafter, at least one copy of the packet likely to successfully reach the destination. In contrast, by failing to attain the desired reliability when transmitting copies of the packets from the source deice to the destination, at least one copy of the packet is unlikely to successfully reach the destination and/or does not reach the destination.

In some approaches, the relation between the desired reliability and channel error for a hop in a pathways of the network, e.g., a pathway between a source device and a gravitated core node that is an activated core, may be established using Equation (1)-Equation (2) below.

In some approaches, a source device, e.g., such as requester "R," may be 'h' hops from the single gravitated core node $\acute{C}$, e.g., the activated core, and be the desired reliability $\dot{S}$ for a transmission from the source device to the single gravitated core node $\acute{C}$. The reliability for the $i^{th}$ hop may be $\dot{S}$, such that $\dot{S}=\Pi\dot{S}_i$. The channel error $\dot{e}$ and the reliability $\dot{S}_i$ for each hop may then be defined using Equation (1).

$$\dot{S}_i = (\dot{S}^{1/h})_{\dot{e}} \quad \text{Equation (1)}$$

Because the transmission is a forward process in a symmetric network, in some approaches the following relationship may be established in Equation (2):

$$\dot{S}^{1/h} \geq (1-\dot{e}) \quad \text{Equation (2)}$$

Based on the established relations, e.g., see Equation (1)-Equation (2), a maximum number of copies of packets to send from the source device in the network to the single gravitated core node $\acute{C}$ and/or a target device in the network to attain the desired reliability may be determined, e.g., see operation 204. It should be noted that the maximum number of copies of packets may in some approaches not need to be sent from the source device to the single gravitated core node $\acute{C}$ and/or the target device in the network to attain the desired reliability. In other words, in some approaches, the maximum number of copies of packets define a number of copies of packets that would potentially be sent from the source device to the single gravitated core node $\acute{C}$ and/or the target device in the network to attain the desired reliability. For example, in one or more of such approaches, a transmission may successfully reach the single gravitated core node $\acute{C}$ and/or the target device in the network to attain the desired reliability as a result of less than the maximum number of copies of packets being sent. Accordingly, the desired reliability would be attained during this transmission because the maximum number of copies of packets is not exceeded in order for the transmission to successfully reach the single gravitated core node $\acute{C}$ and/or the target device in the network.

In one illustrative approach, the maximum number of copies of packets may be determined using Equation (3) below. For example, assuming that $\dot{S}^{1/h}$ is the desired reliability, then the source may send $N_{\dot{S}}$ copies of packets to attain the reliability threshold. Accordingly, Equation (2) may be rearranged to Equation (3) below.

$$\dot{S}^{1/h} = (1-\dot{e}^{N_{\dot{S}}}) \geq \left\{ N_{\dot{S}} = \frac{\log(1-\dot{e}^{1/h})}{\log(\dot{e})} \right\} \quad \text{Equation (3)}$$

An overhead associated with sending packets from the source device to the core node and/or the target device in the network may be determined, for each of the hops, e.g., see operation 206. In some approaches the overhead associated with sending packets from the source device to the core node and/or the target device in the network may be based on the channel error $\dot{e}$ and/or the reliability $\dot{S}_i$ for each hop. For example, because a probability of a packet being forwarded correctly at each hop is $\dot{S}^{1/h}$, the total expected packet overhead, |OH|, may be determined using Equation (4) below.

$$|OH| = N_{\dot{S}} \sum_{i=0}^{h-1} \dot{e}^{i/h} = \frac{\log(1-\dot{e}^{1/h})(1-\dot{S})}{\log(\dot{e})(1-\dot{S}^{1/h})} \quad \text{Equation (4)}$$

In Equation (4), it may be observed that the overhead calculated does not consider the acknowledgements that each hop may provide for the movement forward. This may be taken into account for further optimization, as will be described in greater detail in various approaches and equations elsewhere below. For example, in some approaches, the sum of the overheads, e.g., a first sum, may be incorporated into an acknowledged pathway operative, e.g., see operation 208. The acknowledged pathway operative may include one or more types of information alternative to and/or in addition to the first sum. For example, in some approaches the acknowledged pathway operative may specify the desired reliability ($\dot{S}$) and/or the channel error ($\dot{e}$). The acknowledged pathway operative may be used in one or more equations below to consider the acknowledgements that each hop provides.

In some modes of the acknowledged pathway operative, when a source device sends a copy of a packet, the next-hop node sends back an acknowledgment for a correctly received packet. Retransmission of the symmetric flow may stop as soon as the source receives an acknowledgment packet. This way, an overhead associated with transmitting more than one copy of a packet to the single gravitated core node $\acute{C}$ and/or the target device in the network is minimized.

Various illustrative approaches for determining an acknowledged pathway operative are described below, e.g., see Equation (5)-Equation (7).

In one approach Equation (3) may be modified in order to calculate a maximum number of retransmissions to send from the source device such that the desired reliability can be attained. A source device may retransmit a packet the $i^{th}$ time only if all previous (i–1) copies of the packet were dropped, e.g., not acknowledged. Accordingly, the expected number of transmissions can be modified from the Eq(3) and be represented by $N_{\dot{S}(ack)}$ using Equation (5) below.

$$N_{\dot{S}(ack)} = 1 + \sum_{i=1}^{N_{\dot{S}}} \dot{e}^{i-1} = 1 + \frac{(1 - \dot{e}^{N_{\dot{S}}})}{(1 - \dot{e})} \qquad \text{Equation (5)}$$

Operation 210 includes determining, for each of the hops, an overhead associated with sending an acknowledgement packet to the source device, e.g., from each hop in response to successfully receiving a copy of the packet. The acknowledgement packet is preferably sent from a hop to the source device in response to receiving one or more of the packets sent from the source device. Note in some approaches, a single acknowledgement packet may be sent from the target device to the source device in response to receiving one or more of the packets at the target device. In some other approaches, each of the hops may return an acknowledgement packet to the source device in response to receiving an associated one of the acknowledgement packets at the node.

In one preferred approach, Equation (3) may be modified to represent the overhead incurred with the acknowledgements implemented as the acknowledged pathway operative, e.g., see Equation (6) below.

$$|OH|_a = N_{\dot{S}(ack)} \sum_{i=0}^{h-1} \dot{e}^{1/h} = \left(1 + \frac{\dot{S}^{1/h}}{(1-\dot{e})}\right)\frac{(1-\dot{S})}{(1-\dot{S}^{1/h})} \qquad \text{Equation (6)}$$

A sum of the overheads associated with sending at least one acknowledgement packet to the source device using the hops may be determined, e.g., a second sum.

The first sum and/or the second sum of the overheads may be used to determine whether to use a given communication pathway based on an amount of overhead associated therewith. For example, in some approaches a predetermined threshold value may be used to determine whether use of a communication pathway involves more than an acceptable amount of associated overhead. The predetermined threshold value may be set, e.g., by input received from an administrator device, as a nominal value such as one, by a known type of management that is configured to monitor performance of the network and adjust the predetermined threshold in response to a determination that the network is underperforming, etc.

Decision 212 includes determining whether a sum of the overhead associated with sending packets from the source device to the target device in the network, e.g., the first sum, and the overhead associated with sending acknowledgement packet to the source device, e.g., the second sum, is less than a predetermined threshold value. The sum of the first sum and the second sum may be referred to as "operational overhead" of the network. In one preferred approach, in order to reduce operational overhead in the network, the pathways of the network associated with such overheads may not be used for communication operations in response to a determination that a sum of the first sum and the second sum is greater than or equal to a predetermined threshold value, e.g., see the "No" logical path of decision 212 continue to operation 214. In some approaches, instead of using the pathways of the network associated with such overheads for the communication operations, method 201 may include performing various of the operations described above to determine if another portion of the network, e.g., other selected pathways, have a lower and acceptable amount of overhead for performing the communication operations on.

In contrast, the pathways of the network associated with such overheads may be used for communication operations in response to a determination that the sum of the first sum and the second sum is greater than or equal to a predetermined threshold value, e.g., see the "Yes" logical path of decision 212 continue to operation 216.

The communication operations may include any known type of communication operation that is performed between at least a source device and at least a target device using one or more nodes along a communication path. In one preferred approach, the target device may be a single gravitated core node, e.g., C. Accordingly, in some approaches the communication operation includes sending a packet from the source device to the activated core. At the activated core, it may be trusted that the packet is capable of being optionally transmitted to another destination thereafter, e.g., a second target device. This is because at least one pathway among the activated core, e.g., established by a nexus of core nodes, may be trusted to retain a connected to the second target device at all times.

In one approach, using the pathways for communication operations includes sending less than the maximum number of copies of packets to the target device in the network, and sending an acknowledgments from the target device to the source device. Note that the desired reliabilities are preferably attained and maintained during such communication operations. In contrast, in another approach, using the pathways for communication operations may include sending the maximum number of copies of packets to the target device in the network. Note that the maximum number of copies of packets are preferably sent to the target device in the network in response to a determination that one less than the maximum number of copies of packets have already been sent but not received by the target device, e.g., based on no acknowledgements being received subsequent to any of the previous iterations of sending the copies of the packets. Furthermore, the desired reliabilities are preferably attained and maintained during such communication operations.

In one illustrative approach, for a network where the number of hops "h" is not relatively high, it may be observed, e.g., see Equation (7), that the acknowledgement operative does not add significantly contribute to the overhead to the network, and hence, it is a strong membership operative to be implemented.

$$\left[1 - \frac{[|OH| - |OH|_a]}{|OH|}\right] \ll 1 \qquad \text{Equation (7)}$$

Accordingly, in some approaches, from Equation (7), Equation (6) and Equation (4), it may be established that the $|OH|_a$ derived in Equation (6) is the optimized overhead cost of the network.

Various benefits are enabled as a result of implementing the techniques described in various embodiments and approaches described herein in a network. These benefits include the determination of an optimized overhead cost of a network, e.g., enabling a reduction in overhead in performed communication operations. This reduction in overhead, and more specifically the reduction in network traffic, is primarily enabled as a result of reducing the number of copies of a packet and/or acknowledgement that are transmitted in the network by using various of the techniques described herein. More fundamentally, this reduction is enabled as a result of utilizing a unicast channel pathway rather than multicast channel pathways. It is useful to understand a cost of maintaining such an operative and then optimizing it to enable the transactions in the established network. In fact, inventors of the novel techniques described herein estimate that operational costs of a network will be merely 3% of the operational costs otherwise experienced in conventional techniques that practice multicast "spamming." Note that conventional techniques of managing conventional networks do not employ the techniques described in various embodiments and described herein and therefore the inventive discoveries disclosed herein proceed contrary to conventional wisdom. Furthermore, in determining and understanding these costs, it is determined whether to use a given pathway of a network for communication operations based on an amount of overhead that such an operations would incur within the network. Accordingly, the techniques described in various embodiments and described herein improve efficiencies of communication operations within the network, as certain communication operations are reserved for performing across pathways that are tested to incur tolerable amounts of overhead, e.g., less than a predetermined threshold value, e.g., see Equation (7).

Figure 3:
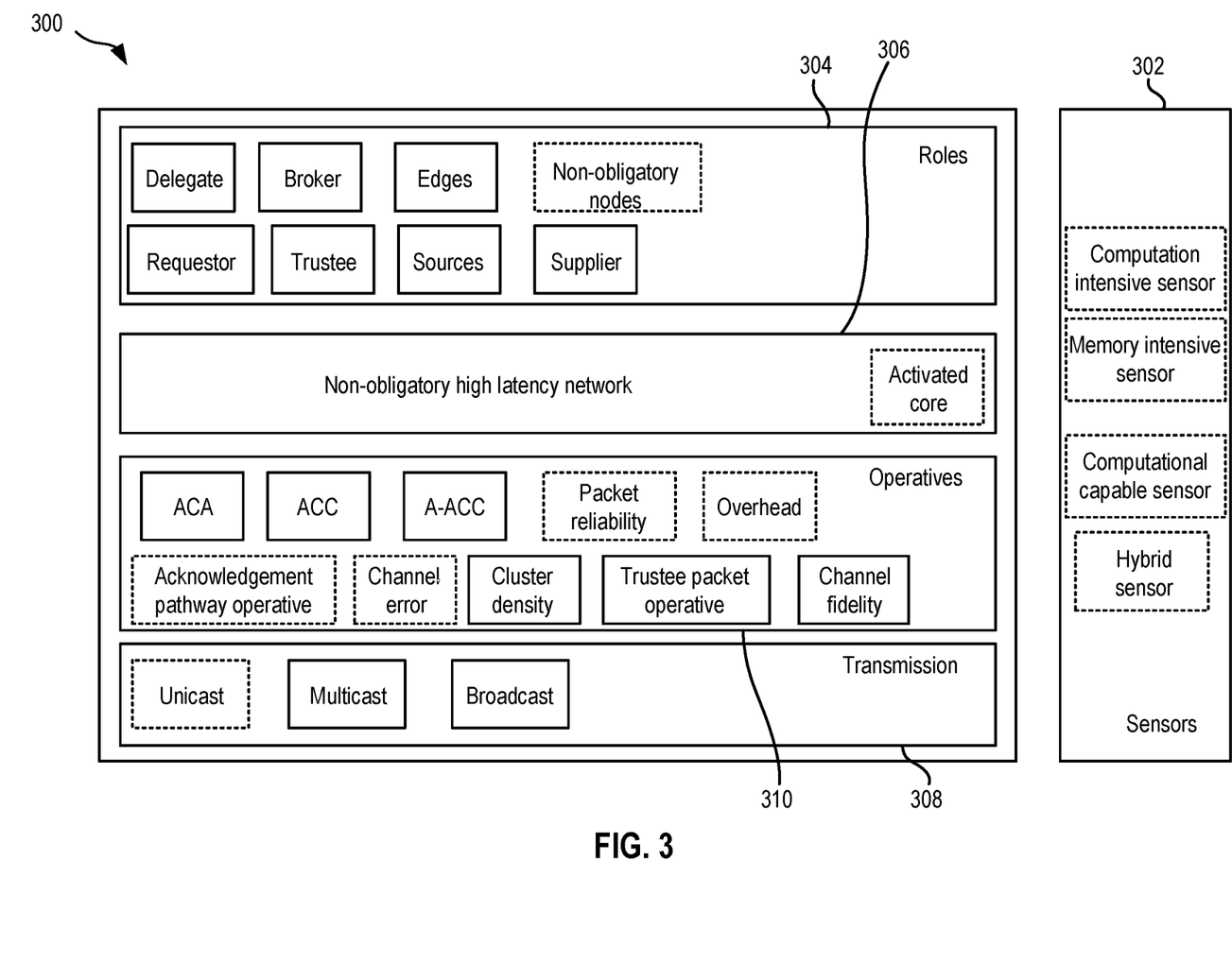
FIG. 3 is a reference architecture, in accordance with one embodiment of the present invention.

FIG. 3 depicts a reference architecture 300 for optimizing operative overhead through a unidirectional request flow, in accordance with one embodiment. As an option, the present reference architecture 300 may be implemented in conjunction with features from any other embodiment listed herein, such as those described with reference to the other FIGS. Of course, however, such reference architecture 300 and others presented herein may be used in various applications and/or in permutations which may or may not be specifically described in the illustrative embodiments listed herein. Further, the reference architecture 300 presented herein may be used in any desired environment.

It may be prefaced that the dashed lines of the reference architecture 300 indicate features that are enabled in an illustrative approach to enable optimization of operative overhead through a unidirectional request flow.

The reference architecture 300 includes sensors 302 which are devices which can measure property and respond with feedback. In some approaches, these devices are the core building block of the M2M network. The reference architecture 300 also includes roles 304, e.g., a target device and a source device, which are the different roles that a sensor can play depending on the capabilities of the sensor. An activated core of a non-obligatory high latency network 306 is a network within the M2M network that is formed by non-obligatory participants. In some approaches, because the participants are non-obligatory, a relatively high latency is expected. The reference architecture 300 also includes operatives 310 that define how these sensors and capabilities thereof are used to achieve a predetermined task. Finally, the reference architecture 300 includes a transmission 308 that defines a flow within the network.

Figure 4:
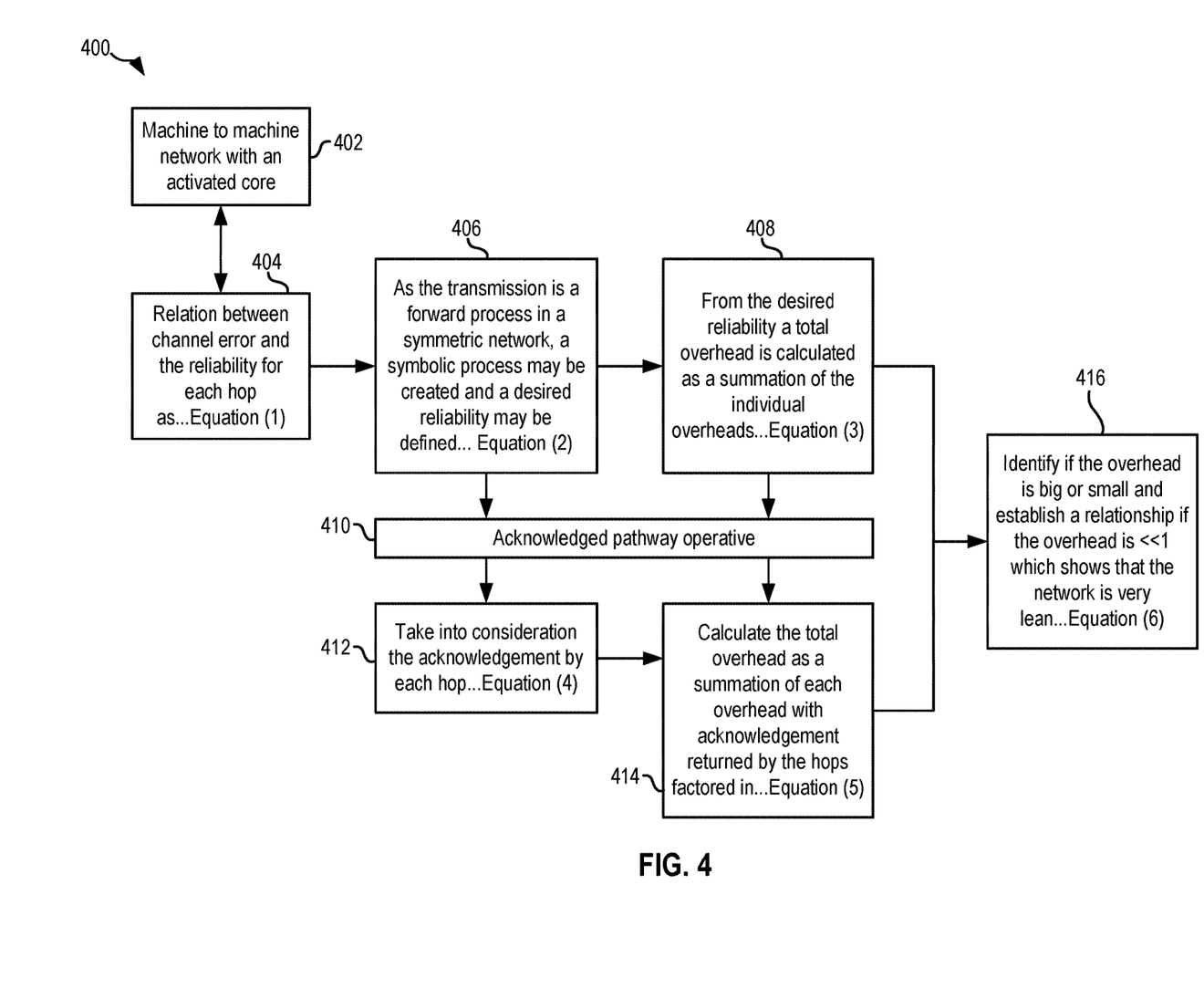
FIG. 4 is a flowchart of a method, in accordance with one embodiment of the present invention.

Now referring to FIG. 4, a flowchart of a method 400 is shown according to one embodiment. The method 400 may be performed in accordance with the present invention in any of the environments depicted in FIGS. 1-4, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that the operations of method 400 are similar to various operations of method 201. For example, various operations of method 400 reference various equations described elsewhere herein within method 201.

Operation 402 includes defining a machine to machine network with an activated core.

A relation between channel error and the reliability for each hop of the network is established in operation 404. In some approaches Equation (1) may be used to establish the relation.

Based on the transmission being a forward process in a symmetric network, a symbolic process may be created, and a desired reliability may be defined, e.g., see operation 406. In some approaches Equation (2) may be used to in operation 406.

From the desired reliability, a total overhead is calculated as a summation of the individual overheads in operation 408. In some approaches, Equation (3) may be used to calculate the summation.

Information obtained from operations 406-408 may be incorporated into an acknowledged pathway operative 410 which may be used in operations 412-414.

Operation 412 takes the acknowledgement by each hop into consideration and may include solving Equation (4). The total overhead is calculated in operation 414 as a summation of each overhead with acknowledgement returned by the hops factored in. Equation (5) may be used to determine the total overhead in some approaches.

It may be identified whether the overhead is big or small and a relationship is established if the overhead is <<1 which shows that the network is very lean, e.g., see operation 416. Equation (6) may be used to establish such a relationship in some approaches.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
establishing, for each hop in pathways of a network, a relation between a desired reliability and channel error;
based on the established relations, determining a maximum number of copies of packets to send from a source device in the network to a target device in the network to attain the desired reliabilities;
determining, for each of the hops, an overhead associated with sending packets from the source device to the target device in the network, wherein a first sum of the overheads associated with sending packets from the source device to the target device is incorporated into an acknowledged pathway operative;
determining, for each of the hops, an overhead associated with sending an acknowledgement packet to the source device, wherein a second sum is a sum of the overheads associated with sending the acknowledgement packet to the source device; and
in response to a determination that a sum of the first sum and the second sum is less than a predetermined threshold value, using the pathways for communication operations.

2. The computer-implemented method of claim 1, wherein the network is an internet-based network that includes an activated core of non-obligatory nodes, wherein the activated core has a minimal utility driven topology that makes the network functional.

3. The computer-implemented method of claim 1, wherein the acknowledgement packet is sent to the source device in response to receiving one of the packets sent from the source device.

4. The computer-implemented method of claim 3, wherein the pathways are unidirectional pathways.

5. The computer-implemented method of claim 1, comprising: in response to a determination that the sum of the first sum and the second sum is greater than the predetermined threshold value, not using the pathways for communication operations.

6. The computer-implemented method of claim 1, wherein using the pathways for communication operations includes sending less than the maximum number of copies of packets to the target device in the network.

7. The computer-implemented method of claim 1, wherein using the pathways for communication operations includes sending the maximum number of copies of packets to the target device in the network, wherein the maximum number of copies of packets are sent to the target device in the network in response to a determination that one less than the maximum number of copies of packets have already been sent but not received by the target device.

8. A computer program product, the computer program product comprising a computer readable storage medium having program instructions embodied therewith, the program instructions readable and/or executable by a computer to cause the computer to:
establish, by the computer, for each hop in pathways of a network, a relation between a desired reliability and channel error;
based on the established relations, determine, by the computer, a maximum number of copies of packets to send from a source device in the network to a target device in the network to attain the desired reliabilities;
determine, by the computer, for each of the hops, an overhead associated with sending packets from the source device to the target device in the network, wherein a first sum of the overheads associated with sending packets from the source device to the target device is incorporated into an acknowledged pathway operative;
determine, by the computer, for each of the hops, an overhead associated with sending an acknowledgement packet to the source device, wherein a second sum is a sum of the overheads associated with sending the acknowledgement packet to the source device; and
in response to a determination that a sum of the first sum and the second sum is less than a predetermined threshold value, use, by the computer, the pathways for communication operations.

9. The computer program product of claim 8, wherein the network is an internet-based network that includes an activated core of non-obligatory nodes, wherein the activated core has a minimal utility driven topology that makes the network functional.

10. The computer program product of claim 8, wherein the acknowledgement packet is sent to the source device in response to receiving one of the packets sent from the source device.

11. The computer program product of claim 10, wherein the pathways are unidirectional pathways.

12. The computer program product of claim 8, the program instructions readable and/or executable by a computer to cause the computer to: in response to a determination that the sum of the first sum and the second sum is greater than the predetermined threshold value, not using, by the computer, the pathways for communication operations.

13. The computer program product of claim 8, wherein using the pathways for communication operations includes sending less than the maximum number of copies of packets to the target device in the network.

14. The computer program product of claim 8, wherein using the pathways for communication operations includes sending the maximum number of copies of packets to the target device in the network, wherein the maximum number of copies of packets are sent to the target device in the network in response to a determination that one less than the maximum number of copies of packets have already been sent but not received by the target device.

15. A system, comprising:
a processor; and
logic integrated with the processor, executable by the processor, or integrated with and executable by the processor, the logic being configured to:
establish, for each hop in pathways of a network, a relation between a desired reliability and channel error;
based on the established relations, determine a maximum number of copies of packets to send from a source device in the network to a target device in the network to attain the desired reliabilities;
determine, for each of the hops, an overhead associated with sending packets from the source device to the target device in the network, wherein a first sum of the overheads associated with sending packets from the source device to the target device is incorporated into an acknowledged pathway operative;
determine, for each of the hops, an overhead associated with sending an acknowledgement packet to the source device, wherein a second sum is a sum of the overheads associated with sending the acknowledgement packet to the source device; and in response to a determination that a sum of the first sum and the second sum is less than a predetermined threshold value, use the pathways for communication operations.

16. The system of claim 15, wherein the network is an internet-based network that includes an activated core of non-obligatory nodes, wherein the activated core has a minimal utility driven topology that makes the network functional.

17. The system of claim 15, wherein the acknowledgement packet is sent to the source device in response to receiving one of the packets sent from the source device.

18. The system of claim 17, wherein the pathways are unidirectional pathways.

19. The system of claim 15, the logic being configured to: in response to a determination that the sum of the first sum and the second sum is greater than the predetermined threshold value, not using the pathways for communication operations.

20. The system of claim 15, wherein using the pathways for communication operations includes sending less than the maximum number of copies of packets to the target device in the network.

* * * * *